United States Patent Office 2,970,096
Patented Jan. 31, 1961

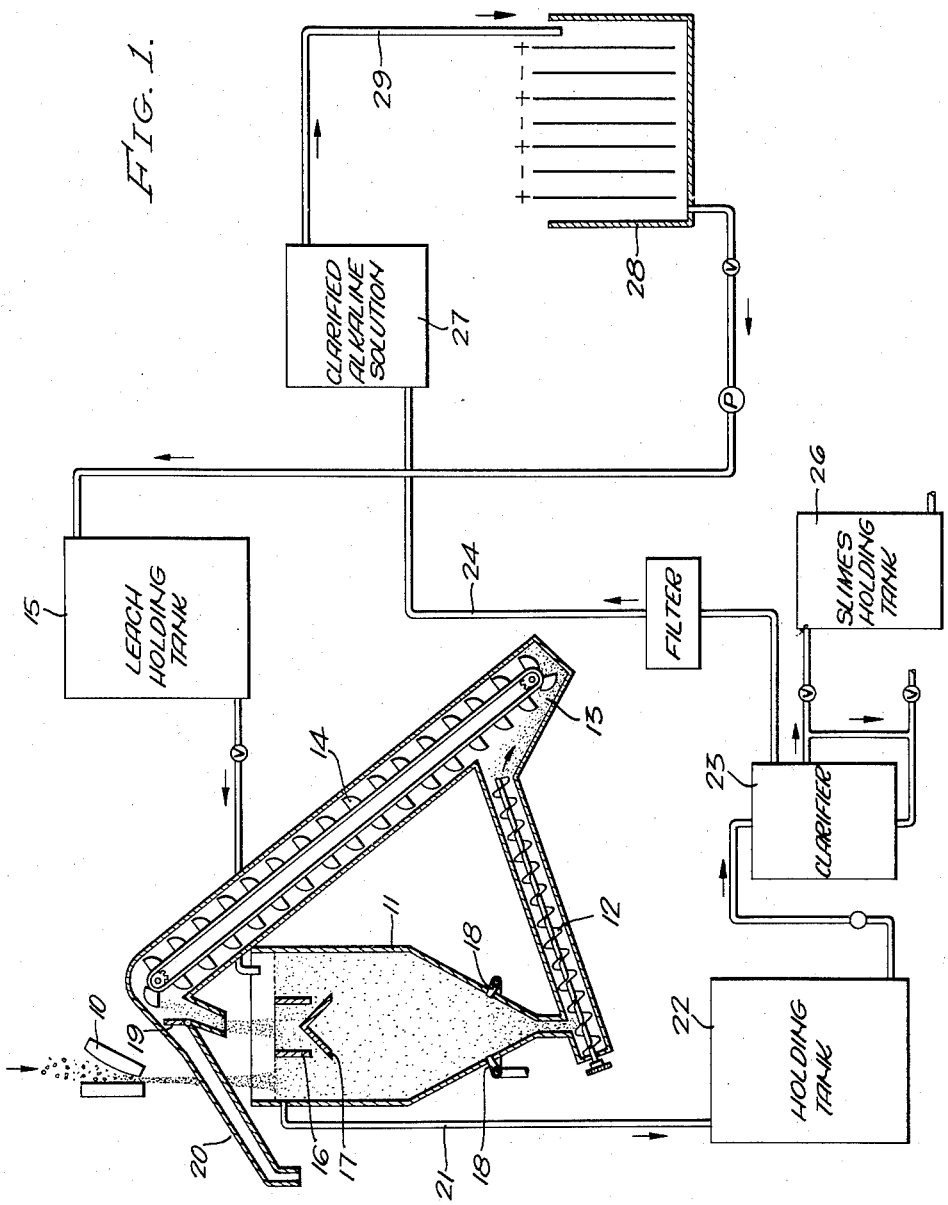

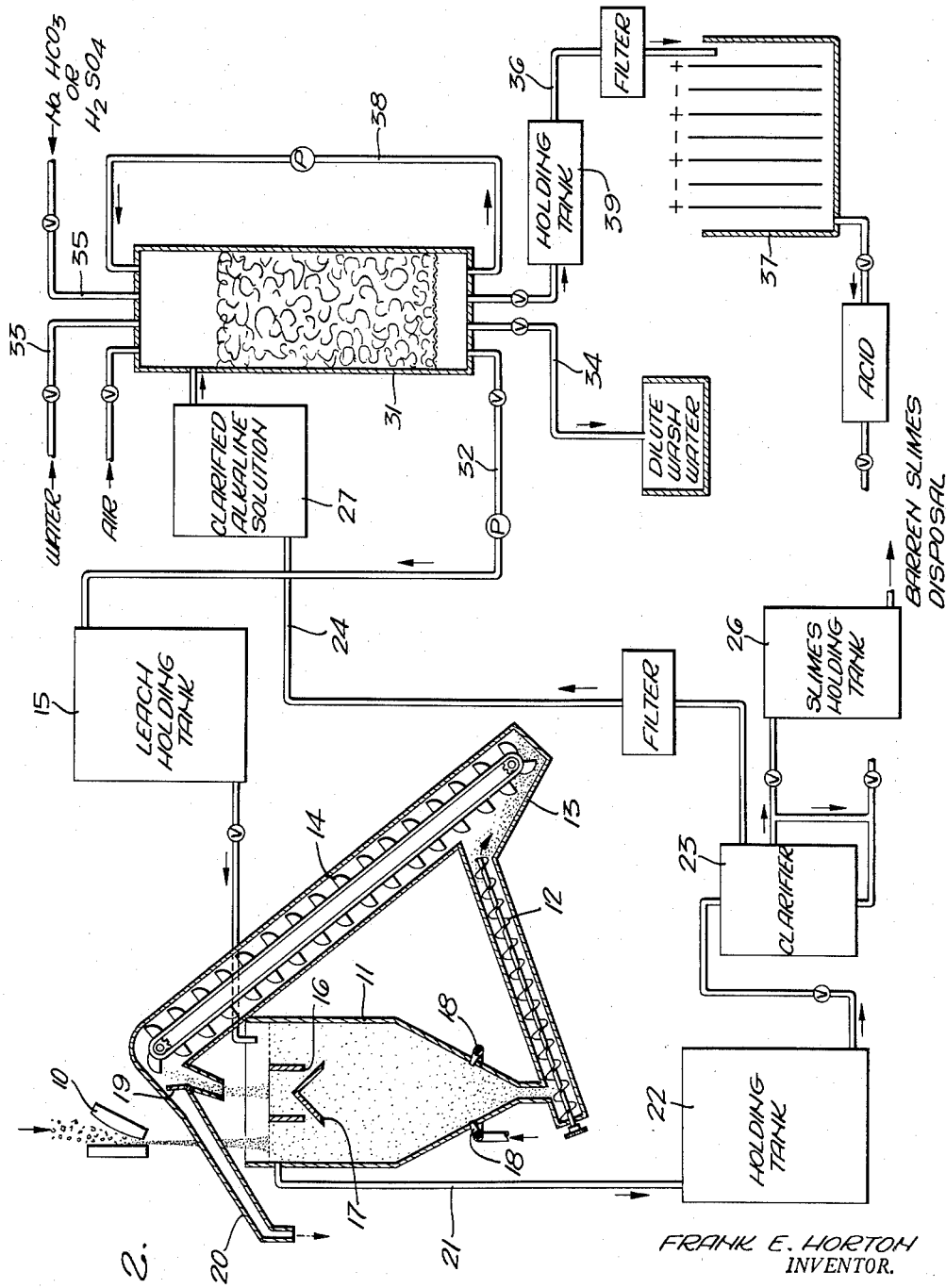

2,970,096

PROCESS AND APPARATUS FOR TREATING OXIDIZED COPPER ORES

Frank E. Horton, Tucson, Ariz., assignor to Banner Mining Company, Tucson, Ariz., a corporation of Nevada Filed June 26, 1958, Ser. No. 744,779

3 Claims. (Cl. 204—106)

This invention relates to a process and an apparatus for recovering copper from oxidized copper ores which contain substantial amounts of calcium and/or magnesium carbonates. This application may be regarded as a continuation-in-part of my copending application Serial No. 669,449, filed July 2, 1957, and now abandoned.

Explanatory of the present invention there are many oxidized copper ores which are relatively free of calcium and/or magnesium carbonates and these ores are suitable for acid leach treatment and the recovery of copper by conventional procedures. However, there are substantial amounts of oxidized copper ores which contain calcium and/or magnesium carbonates and with these ores an acid leach is unsuitable primarily because of the fact that the acid reacts with the carbonates and largely exhausts itself thereon before combining with the copper.

A typical ore for which this present process and apparatus is suitable is that oxidized copper ore obtainable from the Mineral Hill area south of Tucson, Arizona. This oxidized copper ore contains substantial amount of chrysocolla, $CuSiO_3$, $2H_2O$ and minor amounts of azurite $Cu_3(CO_3)2(OH)_2$, malachite $Cu_2Co_3(OH)_2$, tenorite CuO, melaconite CuO and cuprite $Cu_2O$. These ores also contain as high as 20% of calcium and/or magnesium carbonates and due to the presence of these carbonates an acid leach is unsuitable. Consequently these ores have heretofore been discarded as waste. The copper content of this type of oxidized ore is generally too low to be commercial as a direct smelting ore.

The primary object of the present invention is to provide a method and apparatus for recovering copper from oxidized copper ores that contain substantial amounts of calcium and/or magnesium carbonates.

In accordance with the present invention such ores are leached with an alkaline leach solution such as sodium hydroxide, potassium hydroxide, sodium carbonate or potassium carbonate. The higher solubilities of the hydroxides permit the use of stronger and consequently faster acting solutions. The hydroxides are therefore preferable to the carbonate leach solutions. Sodium hydroxide is the cheaper of the two hydroxides and yields more alkalinity per unit of weight. For economical reasons therefore sodium hydroxide is preferable to potassium hydroxide.

The mere addition of an alkaline leach solution to an oxidized copper ore of the above mentioned characteristics will not leach an ore satisfactorily due to the formation of silica gels from the chrysocolla constitutent of the ore. These gels resist continued penetration of the leach solution into the ore particles. It is consequently necessary to remove or disperse these silica gels in order to secure efficient or adequately thorough leaching.

An object of the present invention is therefore to provide a leaching method for leaching oxidized copper ores containing carbonates with an alkaline leach solution wherein the ore is continually moved, scrubbed or agitated to bring about a removal or dispersion of the silica gel and allow continued penetration by the leach solution.

The reactions of the minerals above mentioned with sodium hydroxide are probably as follows:

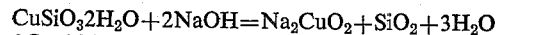
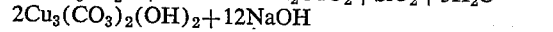
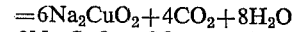
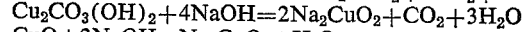
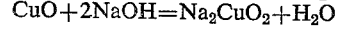

Copper is amphoteric and goes over into the acid radical forming sodium cuprate, $Na_2CuO_2$. I have succeeded in isolating and establishing that sodium cuprate is formed during the alkaline leach. Spectroanalyses positively identified the presence of only the elements sodium, copper, and oxygen.

Quantitative chemical analyses showed the following:

Assay of isolated product=45.8% copper
Theoretical percent of copper in $Na_2CuO_2$=44.8% copper
Physical properties are crystalline, greenish-blue color and hydroscopic.

The slightly higher percent of copper in the isolated product as compared to the theoretical is probably due to some loss of water of crystallization.

During early attempts to make an economical extraction of copper by treating the oxidized copper ore containing calcium and/or magnesium carbonates with the above alkaline reagent, the results proved somewhat erratic with extractions ranging from 20% to 65% of the available copper. Finer grinding did not tend to improve the extraction. Visual examination of the tailings did not indicate that the unrecovered, but nevertheless available copper, was present therein. Sodium cuprate ionizes $2Na^+CuO_2^-$. The cuprate ion apparently disassociates $Cu^{++}O_2^{--}$. This is evidenced by the fact that during electrolysis the copper is deposited as metallic copper on the cathode and not as an oxide at the anode. Therefore the loss of copper from the solution could be the result of adsorption of either of the two ions on the slimes. To inhibit or retard the adsorption of the cuprate ion on the slimes, I have discovered that it is sometimes advantageous to pretreat the copper ore with a water solution of potassium permanganate which acts as a modifier and retards the adsorption of the cuprate ions by the slimes. While this pretreatment was initially believed to be uniformly necessary, it has been found that with some ores it can be eliminated and satisfactory results obtained.

It is therefore another object of the invention to provide an alkaline leach treatment for oxidized copper ores containing calcium and/or magnesium carbonates wherein the ore may be pretreated with potassium permaganate solution to inhibit adsorption of copper ions by the slimes, and to provide a method for determining whether such pretreatment is necessary or may be dispensed with.

Another object of the invention is to provide a method and apparatus for producing from oxidized copper ores an alkaline electrolyte from which copper can be recovered by electrolysis, or from which cuprate can be converted to copper sulphate as an acid electrolyte of sufficient concentration for economical recovery of copper by electrolysis.

With the foregoing and other objects in view which will be made manifest in the following detailed description and specifically pointed out in the appended claims, reference is made to the accompanying drawings for an illustrative embodiment of the invention wherein:

Figure 1 is a diagrammatic view of one form of apparatus suitable for use in practicing the present invention; and Fig. 2 is a similar view of an alternative form of apparatus that may be employed.

Referring to the accompanying drawings wherein similar reference characters designate similar parts throughout, and particularly to Fig. 1, oxidized copper ore is crushed in a crusher 10 to approximately ⅜" particles and finer and is deposited in a leaching tank 11. This leaching tank preferably has a conical bottom that feeds into a screw conveyor 12 that leads to a sump 13 at the bottom of a bucket conveyor 14. The alkaline leach reagent, which is preferably sodium hydroxide for the reasons previously explained is fed into tank 11 from a holding tank 15. In the case of sodium hydroxide the concentration should be between 5 normal and 10 normal. Usually it will be found preferable to use a concentration of approximately 7 to 7½ normal.

The amount of leach solution supplied to tank 11 is not critical but is usually supplied at the ratio of 8 pounds of solution to 1 pound of ore, or roughly, one gallon of leach solution to one pound of ore. When the solution and ore are together in tank 11 the screw conveyor 12 and bucket conveyor 14 are continually operated so that the ore and solution together are recycled through tank 11. The screw conveyor and bucket conveyor together with the settling of the ore in tank 11 serve to constantly move, scrub or agitate the ore to bring about a removal or dispersion of the silica gels that form as a result of the action of the alkaline leach on the chrysocolla contained in the ore. A feed well 16 is provided for the purpose of preventing coarse particles from reaching the overflow. The conical distributor 17 apportions the feed evenly to all parts of tank 11. Jets 18 may be arranged to discharge leach solution through the conical bottom to keep the ore flowing freely toward the screw conveyor 12.

Recycling of the ore and leach solution through tank 11 is continued until an assay of the leach solution indicates an economical and commercial extraction of the available copper present in the original ore. Usually this will take from seventy-two to ninety-six hours.

When the leaching period is complete the original ore particles or charge which is now in the form of tailings, is washed with water until all of the adhering leach solution in these tails has been removed. Thereafter, a gate 19 is adjusted to divert the tails through a chute 20 to the tailing dump. The pregnant leach solution is withdrawn from tank 11 through an outlet 21 to a holding tank 22. A new batch of ore can then be admitted to tank 11 and the above described procedure repeated.

From the holding tank 22 the pregnant solution with its contained slimes is transferred to a clarifier or thickener 23. This clarifier may be either of the settling type, filtering type, or a combination of the two.

The clarified pregnant solution is transferred from the clarifier 23 through a conduit 24 to a holding tank 27. The slimes are washed with water to an economical point, that being the point where all of the adhering leach solution has been removed. The wash water then follows the path of the clarified pregnant solution. Thereafter the slimes are transferred to a slime holding tank 26. The clarified pregnant solution which was conducted through conduit 24 to a holding tank 27 is suitable for use as an electrolyte from which the copper can be recovered in the electrolytic cell 28 to which the solution can be conducted through conduit 29. To recover copper directly from this alkaline electrolyte, an electro potential of from 1.2 to 1.4 volts is imposed. As the resistance of an alkaline electrolyte is higher than that of an acid electrolyte, the amperage obtained at the required voltage is lower. As the rate of deposition is dependent upon amperage, the rate of deposition from an alkaline solution is proportionately slower than that obtainable from an acid solution. The spent electrolyte consisting of sodium hydroxide can be returned from cell 28 to holding tank 15 through conduit 30 and reused as leach solution on additional raw ore. The cathodes on which the copper is deposited in cell 28 are removed from the cell as salable copper.

An alternative treatment for the clarified alkaline pregnant solution is illustrated in Fig. 2. Therein the pregnant solution in tank 27 is conducted to an ion-exchange unit indicated at tank 31 wherein the solution may be treated in the manner disclosed in my copending application Serial No. 720,549, filed March 11, 1958. Briefly stated, this consists of passing the clarified pregnant solution through the hydroxyl form of cotton, that is, cotton which has been treated with sodium hydroxide thus impregnating the cotton with hydroxyl anions. When the pregnant alkaline solution containing the sodium cuprate encounters this cotton, the cuprate ions are exchanged for the hydroxyl anions of the cotton. These reactions are represented by the following equation:

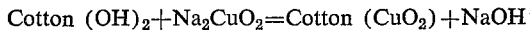

Cotton $(OH)_2 + Na_2CuO_2 =$ Cotton $(CuO_2) + NaOH$

The purposes of ion exchange treatment are:
(1) To remove only cuprate ions from the pregnant alkaline leach solution, thus purifying a resultant electrolyte;
(2) To concentrate thre cuprate ions; and
(3) To substantially reduce the volume of the final desired electrolyte.

The effluent from tank 31 consisting of sodium hydroxide, as indicated in above equation from which the cuprate has been removed as above indicated, can be returned to tank 15 through conduit 32 and used as leach solution. Air may be supplied under pressure to the top of tank 31 to expel the remaining liquor therein through conduit 32. Thereafter wash water is passed through tank 31 from wash water inlet 33 and carried off through wash water outlet 34. The cuprate ions now present on the cotton in tank 31 are eluted therefrom in either of two manners:

(1) A sodium bicarbonate water solution may be supplied through an elutriant inlet 35 and on passing through the cotton, the cuprate ions on the cotton are exchanged for hydroxyl ions present in the sodium bicarbonate solution. The probable reaction is:

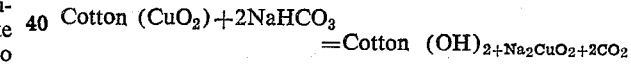

Cotton $(CuO_2) + 2NaHCO_3$
$=$ Cotton $(OH)_{2} + Na_2CuO_2 + 2CO_2$

The eluate, now containing purified sodium cuprate as indicated above, can be conducted through conduit 36 to the electrolytic cell 37.

It frequently, however, is desirable to recycle the effluent from tank 31 through the cotton to assure that all of the cuprate has been removed therefrom. Such recycling circuit is indicated at 38. We have found that it is possible to adsorb approximately two and one-half ounces of copper as cuprate on one pound of cotton by passing electrolyte leach solution containing the sodium cuprate successively over and through the hydrolyzed cotton. When the cuprate ions are exchanged for the hydroxyl anions on the cotton the cotton turns blue in color, the depth of color depending to a great extent on the quantity of ion exchange.

When the sodium bicarbonate is passed over and through the cotton to effect a second ion exchange and recover the cuprate ions from the cotton as sodium cuprate, the cotton becomes paler and paler and ultimately its original white. Recycling of the sodium bicarbonate solution through piping 38 is usually desirable and frequently is necessary to effect a complete ion exchange indicated by the cotton returning to its original while color. The cotton, as indicated by the above equation, is left in its original hydrolyzed condition and is ready for ion exchange with a succeeding batch of leach solution.

The volume of saturated sodium bicarbonate elutriant at approximately 80° F. that is employed is in the order of one-tenth of the original pregnant solution that has passed through the cotton to deposit the cuprate ions thereon. Consequently, as impurities in the leach solution merely pass through the cotton without effecting an ion exchange therewith, the recovery of the cuprate ions back from the cotton not only serves to purify, but also to concentrate, inasmuch as the volume of the elutriant received from tank 31 will be only in the order of one-tenth of the volume of pregnant leach solution initially passed through the cotton. When the cuprate has been completely removed from the cotton, the eluate is conducted to cell 37 and subjected to electrolysis. A potential of 1:2 to 1:4 volts is imposed in the cell and copper is deposited on the cathodes which can be removed as salable copper. Sodium hydroxide is formed in the spent electrolyte. This sodium hydroxide can be returned to tank 15 for reuse as leach solution.

(2) The alternative method of eluting the cuprate from the cotton in tank 31 after the cuprate ions have been exchanged for the hydroxyl ions thereon and the cotton has been washed is to elute the cuprate from the cotton with a 20% solution by weight of sulfuric acid which is supplied through conduit 35. The probable equation is as follows:

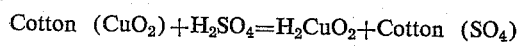

Cotton $(CuO_2) + H_2SO_4 = H_2CuO_2 + $ Cotton $(SO_4)$

The cupric acid in the solution with an excess of sulfuric acid present undergoes the following reaction:

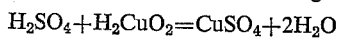

$H_2SO_4 + H_2CuO_2 = CuSO_4 + 2H_2O$

The resulting eluate or electrolyte is a mixture of copper sulphate, water and an excess of free sulfuric acid, and as such, is a conventional electrolyte for deposition of electrolytic grade of copper. Recycling of this elutriant (sulfuric acid solution) through the cotton by means of piping 38 may be necessary to effect a complete removal of the cuprate. The eluate or electrolyte may be conducted to the electrolytic cell 37. The copper is deposited from the electrolyte by electrolysis in the conventional manner that copper is recovered from acid electrolytes. In employing this alternative method, there is likewise a purification in that only the cuprate ions, and not the impurities, exchange with the hydroxyl ions of the cotton. Also, there is likewise a concentration in that the volume of elutriant employed need only be a small fraction of the volume of pregnant leach solution passed through the cotton to deposit the cuprate ions thereon.

While sulfuric acid or sodium bicarbonate solutions have been mentioned herein as elutriants for removing the cuprate from the cotton, other elutriants can be used in lieu thereof such as sodium metaphosfate, sodium borate, ammonium sulfate, carbonic acid, ammonium carbonate and others.

An additional amount of sulfuric acid is produced in the spent electrolyte in the cell 37 and can be withdrawn and used as an elutriant in tank 31. The type of electrolysis used in these processes is known as electrowinning. In the case of electrowinning insoluble anodes are used. Hence by the use of insoluble anodes the resulting spent electrolytes accumulate sulfuric acid in the acid process, and sodium hydroxide in the alkaline process during electrolysis.

The slimes which usually contain some copper and which are supplied to tank 26 may have their copper content eluted therefrom by treatment with sodium bicarbonate or sulfuric acid. The dilute copper containing eluates produced as above described, may be added to leach solution holding tank 15 for leach reagent when alkaline, or when the eluate is acid it is transferred to a holding tank 39 for future use as an acid elutriant.

The following experiment is an example of an elution of copper from a sample of slimes:

51 gms. of slimes from pilot mill test run #5 contained 1.6 grams of copper.

The same 51 gms. of slimes were eluted with 20% sulfuric acid solution.

The eluate resulting from this treatment contained 1.6 gms. of copper.

Therefore a 100% recovery was obtained.

With certain ores the leaching treatment causes a substantial amount of copper to remain in the slimes which is to be avoided if possible. Bottle tests may be run with samples of the ore. In this case a sample of the ore is placed in one bottle and sodium hydroxide leach solution is added thereto. In another bottle a sample of the ore is first pretreated with a water solution of potassium permanganate usually about 10 milligrams of potassium permanganate are added to a sample of one hundred grams of ore and the bottle and contents rolled for a definite period of time. After the sample has been subjected to the potassium permanganate solution, sodium hydroxide leach solution is added thereto. Both bottles are rolled for a suitable length of time—for example seventy-two hours. The leach solutions in both bottles are assayed and the percent copper found in each solution is compared with the percent copper present in the original ore samples. With certain ores little if any improvement is gained by pretreatment with potassium permanganate solution, and when this is the case, pretreatment of the ore in tank 11 with potassium permanganate may be omitted. With other ores there is an advantage in pretreating the ore with potassium permanganate solution to reduce the copper content in the slimes. When this is the case, the ore supplied to tank 11 is pretreated in the leach apparatus with a water solution of potassium permanganate of about one part potassium permanganate to ten thousand parts of ore for a definite period of time. Thereafter the spent potassium permanganate solution is withdrawn. This treatment is followed by leaching the charge of ore with sodium hydroxide solution and the ultimate obtaining of the copper therefrom.

It will be appreciated that while the improved process and apparatus has been primarily designed for treatment of low grade oxidized copper ores containing substantial amounts of chrysocolla calcium and/or magnesium carbonates, it is not necessarily restricted thereto. It may be used on oxidized copper ores containing substantial amounts of chrysocolla but little or no calcium and/or magnesium carbonates. Furthermore, it is acceptable for use on high grade oxidized copper ores thus eliminating smelting which has been the practice heretofore. Recovery of pure salable copper from low grade oxidized copper ores containing substantial amounts of chrysocolla and also containing calcium and/or magnesium carbonates is now possible with my invention, whereas, in the past such ores have not been regarded to be of economical value.

In a pilot mill set up for treatment of oxidized copper ores obtained from the vicinity of Mineral Hill, near Tucson, Arizona, the following observations were made and results obtained:

*Pilot mill batch operations*

LEACHING

| Test Runs | 4th Run | 5th Run |
| --- | --- | --- |
| Dates | Feb. 28–Mar. 4 | Mar. 14–18 |
| Tons Ore or Lbs.—Dry Basis lbs | 1,006 | 1,167 |
| Head, Percent Cu | 2.78 | 2.27 |
| Lbs. Cu—Dry Basis | 28 | 26.5 |
| Gallons Feed Solution | 985 | 947 |
| Lbs. Cu—Start (In solution from previous run) | 23.6 | 1.44 |
| Percent NaOH | 29 | 29 |
| Lbs. NaOH—Start | 2,299 | 2,158 |
| Leach Time hours | 96 | 96 |
| Gallons Pregnant Solution | 987 | 947 |
| Lbs. Cu—Finish | 48.3 | 26.00 |
| Lbs. Cu—Extracted (Lbs. Cu Finish–Lbs. Cu Start) | 24.7 | 24.56 |
| Lbs. NaOH—Finish | 2,261 | 1,970 |
| Lbs. NaOH—Consumed | 38 | 188 |
| Percent Leach Efficiency— $\frac{\text{Lbs. Cu extracted}}{\text{Lbs. Cu Heads}} \times 100$ | 88.2 | 92.6 |

Various changes may be made in the details of the process and apparatus without departing from the spirit and scope of the invention as described by the appended claims.

I claim:
1. The method of extracting copper and preparing an electrolyte from oxidized copper ore particles containing substantial amounts of chrysocolla which ore particles are unsuitable for acid leaching because of the presence of calcium and/or magnesium carbonates, which method comprises leaching the ore particles with a water solution of one of the group consisting of sodium hydroxide and potassium hydroxide of a concentration of between 5 and 10 normal, thus producing a solution containing cuprate anions, and scrubbing the ore particles during the leaching to remove therfrom silica gels thus continually exposing the surfaces of the ore particles to continued leaching.

2. The method of extracting copper and preparing an electrolyte from oxidized copper ore particles containing substantial amounts of chrysocolla which ore particles are unsuitable for acid leaching because of the presence of calcium and/or magnesium carbonates, which method comprises leaching the ore particles with a further solution of sodium hydroxide of a concentration of between 5 and 10 normal, thus producing a solution containing sodium cuprate and scrubbing the ore particles during the leaching to remove therefrom silica gels, thus continuously exposing the surfaces of the ore particles to continued leaching.

3. The method of extracting copper and preparing an electrolyte from oxidized copper ore particles containing substantial amounts of chrysocolla which ore particles are unsuitable for acid leaching because of the presence of calcium and/or magnesium carbonates, which method comprises leaching the ore particles with a water solution of sodium hydroxide of a concentration in the neighborhood of 7 to 7½ normal, thus producing a solution containing sodium cuprate, and scrubbing the ore particles during the leaching to remove therefrom silica gels, thus continually exposing the surfaces of the ore particles to continued leaching.

References Cited in the file of this patent
UNITED STATES PATENTS

| | | |
|---|---|---|
| 725,548 | Ellis | Apr. 14, 1903 |
| 1,115,521 | Ellis | Nov. 3, 1914 |
| 1,679,337 | Moulden et al. | July 31, 1928 |
| 1,757,047 | Hosenfeld et al. | May 6, 1930 |
| 2,329,775 | Lindner et al. | Sept. 21, 1943 |